United States Patent
Migneco et al.

(10) Patent No.: US 11,634,055 B2
(45) Date of Patent: *Apr. 25, 2023

(54) SEAT ASSEMBLY

(71) Applicant: Lear Corporation, Southfield, MI (US)

(72) Inventors: Francesco Migneco, Saline, MI (US); David Gallagher, Sterling Heights, MI (US); Sajad Arabnejad, Ann Arbor, MI (US)

(73) Assignee: Lear Corporation, Southfield, MI (US)

( * ) Notice: Subject to any disclaimer, the term of this patent is extended or adjusted under 35 U.S.C. 154(b) by 192 days.

This patent is subject to a terminal disclaimer.

(21) Appl. No.: 15/930,802

(22) Filed: May 13, 2020

(65) Prior Publication Data

US 2021/0354611 A1    Nov. 18, 2021

(51) Int. Cl.
*B60N 2/56* (2006.01)
*A47C 7/72* (2006.01)
*A47C 31/00* (2006.01)
*A61B 5/18* (2006.01)
(Continued)

(52) U.S. Cl.
CPC .......... *B60N 2/914* (2018.02); *B60N 2/5678* (2013.01); *B60N 2/976* (2018.02); *B60N 2002/924* (2018.02)

(58) Field of Classification Search
CPC ...... B60N 2/914; B60N 2/0244; B60N 2/976; B60N 2/002; B60N 2002/0268; B60N 2/665; B60N 2/0248; B60N 2/66
See application file for complete search history.

(56) References Cited

U.S. PATENT DOCUMENTS

| 5,769,490 A | 6/1998 | Falzon |
| 6,056,360 A | 5/2000 | Schneider |
| 6,079,485 A | 6/2000 | Esaki et al. |
(Continued)

FOREIGN PATENT DOCUMENTS

| CN | 2855822 Y | 1/2007 |
| CN | 203186154 U | 9/2013 |
(Continued)

OTHER PUBLICATIONS

Co-Pending U.S. Appl. No. 16/821,128, filed Mar. 17, 2020.
(Continued)

*Primary Examiner* — Shin H Kim
(74) *Attorney, Agent, or Firm* — Fishman Stewart PLLC

(57) ABSTRACT

A seat assembly may include a seat, a biomedical sensor, a bladder assembly, a pulsed electromagnetic field (PEMF) coil assembly, and/or an electronic control unit (ECU) connected with the biomedical sensor. The ECU may be configured to control the bladder assembly and the PEMF coil assembly, and/or to determine if a user occupying the seat is in a first state or a second state. The first state may correspond to one or more small user movements. Small user movements may include movements having magnitudes below a specified value or threshold. The second state may correspond to one or more large user movements. Large user movements may include movements having magnitudes above the specified value or threshold. The ECU may operate in a first mode when said user is in the first state and operate in a second mode when said user is in the second state.

20 Claims, 6 Drawing Sheets

(51) Int. Cl.
*B60N 2/24* (2006.01)
*B60N 2/90* (2018.01)

(56) References Cited

U.S. PATENT DOCUMENTS

| | | | |
|---|---|---|---|
| 6,088,642 A | 7/2000 | Finkelstein et al. |
| 6,088,643 A | 7/2000 | Long et al. |
| 6,098,000 A | 8/2000 | Long et al. |
| 6,179,378 B1 | 1/2001 | Baumgartner et al. |
| 6,345,839 B1 | 2/2002 | Kuboki et al. |
| 6,353,207 B1 | 3/2002 | Burt |
| 6,506,153 B1 | 1/2003 | Littek et al. |
| 6,559,422 B2 | 5/2003 | Burt |
| 6,682,494 B1 | 1/2004 | Sleichter, III et al. |
| 6,908,152 B2 | 6/2005 | McMillen |
| 7,011,369 B2 | 3/2006 | Massara et al. |
| 7,083,232 B2 | 8/2006 | Frank |
| 7,083,233 B2 | 8/2006 | Massara et al. |
| 7,152,920 B2 | 12/2006 | Sugiyama et al. |
| 7,201,446 B2 | 4/2007 | Massara et al. |
| 7,219,923 B2 | 5/2007 | Fujita et al. |
| 7,267,652 B2 | 9/2007 | Coyle et al. |
| 7,303,231 B2 | 12/2007 | Frank |
| 7,314,451 B2 | 1/2008 | Halperin et al. |
| 7,417,536 B2 | 8/2008 | Lakshmanan et al. |
| 7,688,582 B2 | 3/2010 | Fukazu et al. |
| 7,731,279 B2 | 6/2010 | Asada et al. |
| 7,808,395 B2 | 10/2010 | Raisanen et al. |
| 7,828,050 B2 | 11/2010 | Esaki |
| 7,862,119 B2 | 1/2011 | Schafer et al. |
| 7,866,755 B2 | 1/2011 | Okano |
| 7,900,736 B2 | 3/2011 | Breed |
| 7,967,379 B2 | 6/2011 | Walters et al. |
| 7,967,381 B2 | 6/2011 | Sugiyama |
| 8,341,786 B2 | 1/2013 | Oexman et al. |
| 8,444,558 B2 | 5/2013 | Young et al. |
| 8,616,654 B2 | 12/2013 | Zenk et al. |
| 8,618,451 B2 | 12/2013 | Kunisada |
| 8,706,204 B2 | 4/2014 | Seo et al. |
| 8,710,784 B2 | 4/2014 | Meyer et al. |
| 8,725,311 B1 | 5/2014 | Breed |
| 8,794,707 B2 | 8/2014 | Bocsanyi et al. |
| 8,827,372 B2 | 9/2014 | Yoon |
| 8,958,955 B2 | 2/2015 | Hotary et al. |
| 8,971,839 B2 | 3/2015 | Hong |
| 8,979,191 B2 | 3/2015 | Friderich et al. |
| 8,989,697 B2 | 3/2015 | Leung et al. |
| 9,147,192 B2 | 9/2015 | Dawson et al. |
| 9,237,242 B2 | 1/2016 | Basir |
| 9,272,647 B2 | 3/2016 | Gawade et al. |
| 9,272,689 B2 | 3/2016 | Fung et al. |
| 9,277,385 B2 | 3/2016 | Iwamoto |
| 9,504,416 B2 | 11/2016 | Young et al. |
| 9,815,385 B2 | 11/2017 | Lippman et al. |
| 9,848,814 B2 | 12/2017 | Benson et al. |
| 9,883,821 B2 | 2/2018 | Muehlsteff |
| 9,978,283 B2 | 5/2018 | Jedrzejewski et al. |
| 9,980,680 B2 | 5/2018 | Matsumoto |
| 10,034,631 B1 | 7/2018 | Gallagher et al. |
| 10,210,409 B1 | 2/2019 | Migneco et al. |
| 10,213,147 B2 | 2/2019 | Gallagher et al. |
| 10,308,258 B2 | 6/2019 | Fung et al. |
| 10,328,823 B2 | 6/2019 | O'Bannon et al. |
| 10,358,065 B2 | 7/2019 | McMillen et al. |
| 10,369,074 B2 | 8/2019 | Oberg et al. |
| 10,379,535 B2 | 8/2019 | Migneco et al. |
| 10,391,900 B2 | 8/2019 | Zhao et al. |
| 10,470,968 B2 | 11/2019 | Saren et al. |
| 10,471,868 B2 | 11/2019 | Wheeler |
| 10,492,979 B2 | 12/2019 | Norman et al. |
| 10,556,532 B2 | 2/2020 | Gallagher et al. |
| 10,562,412 B1 | 2/2020 | Main et al. |
| 10,569,668 B2 | 2/2020 | Migneco et al. |
| 10,576,855 B2 | 3/2020 | Dorfler et al. |
| 10,640,010 B2 | 5/2020 | Yetukur et al. |
| 10,709,386 B2 | 7/2020 | Gallagher et al. |
| 10,807,439 B2 | 10/2020 | Migneco et al. |
| 10,898,708 B2 | 1/2021 | Franco-Obregon et al. |
| 11,173,818 B1 * | 11/2021 | Migneco ............. B60N 2/5671 |
| 2003/0039298 A1 | 2/2003 | Eriksson et al. |
| 2003/0075959 A1 | 4/2003 | Xue et al. |
| 2003/0209893 A1 | 11/2003 | Breed et al. |
| 2004/0119599 A1 | 6/2004 | Stevenson et al. |
| 2004/0129478 A1 | 7/2004 | Breed et al. |
| 2006/0244289 A1 | 11/2006 | Bedro |
| 2007/0118054 A1 | 5/2007 | Pinhas et al. |
| 2008/0161989 A1 | 7/2008 | Breed |
| 2008/0216567 A1 | 9/2008 | Breed |
| 2008/0255731 A1 | 10/2008 | Mita et al. |
| 2008/0267460 A1 | 10/2008 | Aoki et al. |
| 2008/0288406 A1 | 11/2008 | Seguin et al. |
| 2009/0008970 A1 | 1/2009 | Flory et al. |
| 2009/0030578 A1 | 1/2009 | Periot et al. |
| 2010/0087748 A1 | 4/2010 | Tobola et al. |
| 2011/0015468 A1 | 1/2011 | Aarts et al. |
| 2012/0080911 A1 | 4/2012 | Brykalski et al. |
| 2012/0086249 A1 | 4/2012 | Hotary et al. |
| 2012/0089299 A1 | 4/2012 | Breed |
| 2012/0116149 A1 | 5/2012 | Pilla et al. |
| 2013/0090816 A1 | 4/2013 | Huber |
| 2013/0127210 A1 | 5/2013 | Jung et al. |
| 2013/0251216 A1 | 9/2013 | Smowton et al. |
| 2014/0070943 A1 | 3/2014 | Breed |
| 2014/0132042 A1 | 5/2014 | Midderhoff et al. |
| 2014/0207333 A1 | 7/2014 | Vandivier et al. |
| 2014/0319895 A1 | 10/2014 | Lange-Mao et al. |
| 2014/0361871 A1 | 12/2014 | Silva et al. |
| 2014/0375089 A1 | 12/2014 | Qureshi et al. |
| 2015/0048658 A1 | 2/2015 | Gawade et al. |
| 2015/0084985 A1 | 3/2015 | Baudu |
| 2015/0126916 A1 | 5/2015 | Hall et al. |
| 2015/0266405 A1 | 9/2015 | Fitzpatrick et al. |
| 2015/0313475 A1 | 11/2015 | Benson et al. |
| 2015/0351692 A1 | 12/2015 | Pereny et al. |
| 2015/0352979 A1 | 12/2015 | O'Bannon et al. |
| 2015/0352990 A1 | 12/2015 | Zouzal et al. |
| 2015/0375653 A1 | 12/2015 | Josefsson et al. |
| 2016/0001781 A1 | 1/2016 | Fung et al. |
| 2016/0003882 A1 | 1/2016 | Loftus |
| 2016/0129920 A1 | 5/2016 | Hall et al. |
| 2016/0143803 A1 | 5/2016 | Portales |
| 2016/0176409 A1 | 6/2016 | Kirsch et al. |
| 2016/0250956 A1 | 9/2016 | Seiting et al. |
| 2016/0278709 A1 | 9/2016 | Ridao Granado et al. |
| 2017/0043681 A1 | 2/2017 | Seiller et al. |
| 2017/0086588 A1 | 3/2017 | Patrick et al. |
| 2017/0225591 A1 | 8/2017 | Tobata et al. |
| 2017/0274906 A1 | 9/2017 | Hassan et al. |
| 2017/0349061 A1 | 12/2017 | Benson et al. |
| 2017/0361748 A1 | 12/2017 | Meachum et al. |
| 2018/0008507 A1 | 1/2018 | Saren et al. |
| 2018/0009343 A1 | 1/2018 | Saren et al. |
| 2018/0015853 A1 | 1/2018 | Lem et al. |
| 2018/0065642 A1 | 3/2018 | Frye et al. |
| 2018/0110960 A1 | 4/2018 | Youngblood et al. |
| 2018/0178692 A1 | 6/2018 | Zhao et al. |
| 2018/0178808 A1 | 6/2018 | Zhao et al. |
| 2018/0215293 A1 | 8/2018 | Gandhi et al. |
| 2018/0325264 A1 | 11/2018 | Gallagher et al. |
| 2018/0345833 A1 | 12/2018 | Gallagher et al. |
| 2018/0361897 A1 | 12/2018 | Lem et al. |
| 2019/0053761 A1 | 2/2019 | Young et al. |
| 2019/0054796 A1 | 2/2019 | Thomas |
| 2019/0126036 A1 | 5/2019 | Franco-Obregon et al. |
| 2019/0133511 A1 | 5/2019 | Migneco et al. |
| 2019/0168771 A1 | 6/2019 | Migneco et al. |
| 2019/0193591 A1 | 6/2019 | Migneco et al. |
| 2019/0239815 A1 | 8/2019 | Gallagher et al. |
| 2019/0275860 A1 | 9/2019 | Migneco et al. |
| 2019/0332902 A1 | 10/2019 | Gallagher et al. |
| 2019/0337412 A1 | 11/2019 | Zouzal et al. |
| 2019/0337431 A1 | 11/2019 | McMillen et al. |
| 2019/0344043 A1 | 11/2019 | Migneco et al. |
| 2020/0035237 A1 | 1/2020 | Kim et al. |

(56) References Cited

U.S. PATENT DOCUMENTS

| | | |
|---|---|---|
| 2020/0113344 A1 | 4/2020 | Youngblood et al. |
| 2020/0170576 A1 | 6/2020 | Lerner |
| 2020/0188211 A1 | 6/2020 | Ellermann |
| 2020/0231428 A1 | 7/2020 | Migneco et al. |
| 2020/0238875 A1 | 7/2020 | Godlewski et al. |
| 2020/0253381 A1 | 8/2020 | Dorfler et al. |
| 2020/0324675 A1 | 10/2020 | Yamamoto et al. |
| 2021/0016686 A1 | 1/2021 | Yetukuri et al. |

FOREIGN PATENT DOCUMENTS

| | | |
|---|---|---|
| CN | 104252615 A | 12/2014 |
| CN | 205468657 U | 8/2016 |
| CN | 108973807 A | 12/2018 |
| DE | 10027686 A1 | 1/2002 |
| DE | 10063478 A1 | 7/2002 |
| DE | 102004010626 A1 | 6/2005 |
| DE | 102004013674 A1 | 10/2005 |
| DE | 102006029871 A1 | 1/2008 |
| DE | 102008029339 A1 | 1/2009 |
| DE | 102009008421 A1 | 10/2009 |
| DE | 102009035566 A1 | 2/2010 |
| DE | 102009031331 A1 | 8/2010 |
| DE | 102009033041 A1 | 1/2011 |
| DE | 102010021332 A1 | 1/2011 |
| DE | 102007006866 B4 | 11/2011 |
| DE | 102010049152 A1 | 11/2011 |
| DE | 102011012431 A1 | 11/2011 |
| DE | 102011016073 A1 | 12/2011 |
| DE | 102011017238 A1 | 12/2011 |
| DE | 102011102021 A1 | 11/2012 |
| DE | 102011113100 A1 | 3/2013 |
| DE | 102011116194 A1 | 4/2013 |
| DE | 102012201430 A1 | 4/2013 |
| DE | 102012216869 A1 | 3/2014 |
| DE | 202015104103 U1 | 8/2015 |
| DE | 102014002942 A1 | 9/2015 |
| DE | 102015011460 A1 | 3/2016 |
| DE | 102015011461 A1 | 3/2016 |
| DE | 102017110812 A1 | 1/2018 |
| DE | 102016011481 A1 | 3/2018 |
| DE | 202017103162 U1 | 5/2018 |
| DE | 102018000765 A1 | 8/2019 |
| DE | 102018001230 A1 | 8/2019 |
| DE | 202019100400 U1 | 1/2020 |
| DE | 202019100710 U1 | 2/2020 |
| DE | 102018007921 A1 | 4/2020 |
| DE | 202019102879 U1 | 5/2020 |
| DE | 202019105369 U1 | 5/2020 |
| DE | 102019008724 A1 | 8/2020 |
| EP | 1077154 A2 | 2/2001 |
| EP | 1749477 A1 | 2/2007 |
| EP | 1932715 A1 | 6/2008 |
| EP | 2149475 A1 | 2/2010 |
| EP | 2205460 B1 | 3/2016 |
| FR | 2988654 A1 | 10/2013 |
| GB | 2512136 A | 9/2014 |
| JP | 2001269380 A | 10/2001 |
| JP | 2005137896 A | 6/2005 |
| JP | 2005237456 A | 9/2005 |
| JP | 2006014756 A | 1/2006 |
| JP | 3857869 B2 | 12/2006 |
| JP | 2009172145 A | 8/2009 |
| JP | 2012196253 A | 10/2012 |
| JP | 2013163405 A | 8/2013 |
| JP | 2019131049 A | 8/2019 |
| WO | 2012/039368 | 3/2012 |
| WO | 2017108157 A1 | 6/2017 |

OTHER PUBLICATIONS

Co-Pending U.S. Appl. No. 15/930,777, filed May 13, 2020.
Co-Pending U.S. Appl. No. 15/930,835, filed May 13, 2020.
Co-Pending U.S. Appl. No. 15/930,865, filed May 13, 2020.
Co-Pending U.S. Appl. No. 17/109,652, filed Dec. 2, 2020.
Chinese Office Action dated Jan. 19, 2023 for Chinese Patent Application No. 202110517525.2.

* cited by examiner

SEAT ASSEMBLY

TECHNICAL FIELD

The present disclosure generally relates to seat assemblies, including seat assemblies that may be used in connection with automatically sensing and reducing discomfort.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some seat assemblies may not provide sufficient functionality, may not identify different types of fidgets/discomfort, and/or may not reduce discomfort depending on the type of discomfort sensed. For example, some seat assemblies may not automatically detect and reduce discomfort.

There is a desire for solutions/options that minimize or eliminate one or more challenges or shortcomings of seat assemblies. The foregoing discussion is intended only to illustrate examples of the present field and is not a disavowal of scope.

SUMMARY

In embodiments, a seat assembly may include a seat, a sensor configured to sense movement of a user of the seat, a bladder assembly connected to the seat, a pulsed electromagnetic field (PEMF) coil assembly connected to the seat, and/or an electronic control unit (ECU) connected with the biomedical sensor. The ECU may be configured to control the bladder assembly and the PEMF coil assembly, and/or to determine if a user occupying the seat is in a first state or a second state. The first state may correspond to one or more small user movements. Small user movements may include movements having magnitudes below a specified value or threshold. The second state may correspond to one or more large user movements. Large user movements may include movements having magnitudes above the specified value or threshold. The ECU may be configured to operate in a first mode when said user is in the first state to reduce the number of small user movements (e.g., the number of future small user movements) and operate in a second mode when said user is in the second state to reduce the number of large user movements (e.g., the number of future large user movements).

With embodiments, a method of operating a seat assembly may include determining, via a sensor, if a user of a seat is in at least one of a first state corresponding with small movements or a second state corresponding with large movements, operating an electronic control unit (ECU) in a first mode if the user is in the first state to reduce the small movements, and/or operating the ECU in a second mode if the user is in the second state to reduce the large movements. Operating the ECU in the first mode may include activating a bladder assembly proximate a lower portion of a seat back of the seat, and/or activating a pulsed electromagnetic field (PEMF) coil assembly proximate the lower portion of the seat back. Operating the ECU in the second mode may include activating the bladder assembly proximate the lower portion, a middle portion, and an upper portion of the seat back, and/or activating the PEMF coil assembly proximate the lower portion, the middle portion, and the upper portion of the seat back.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
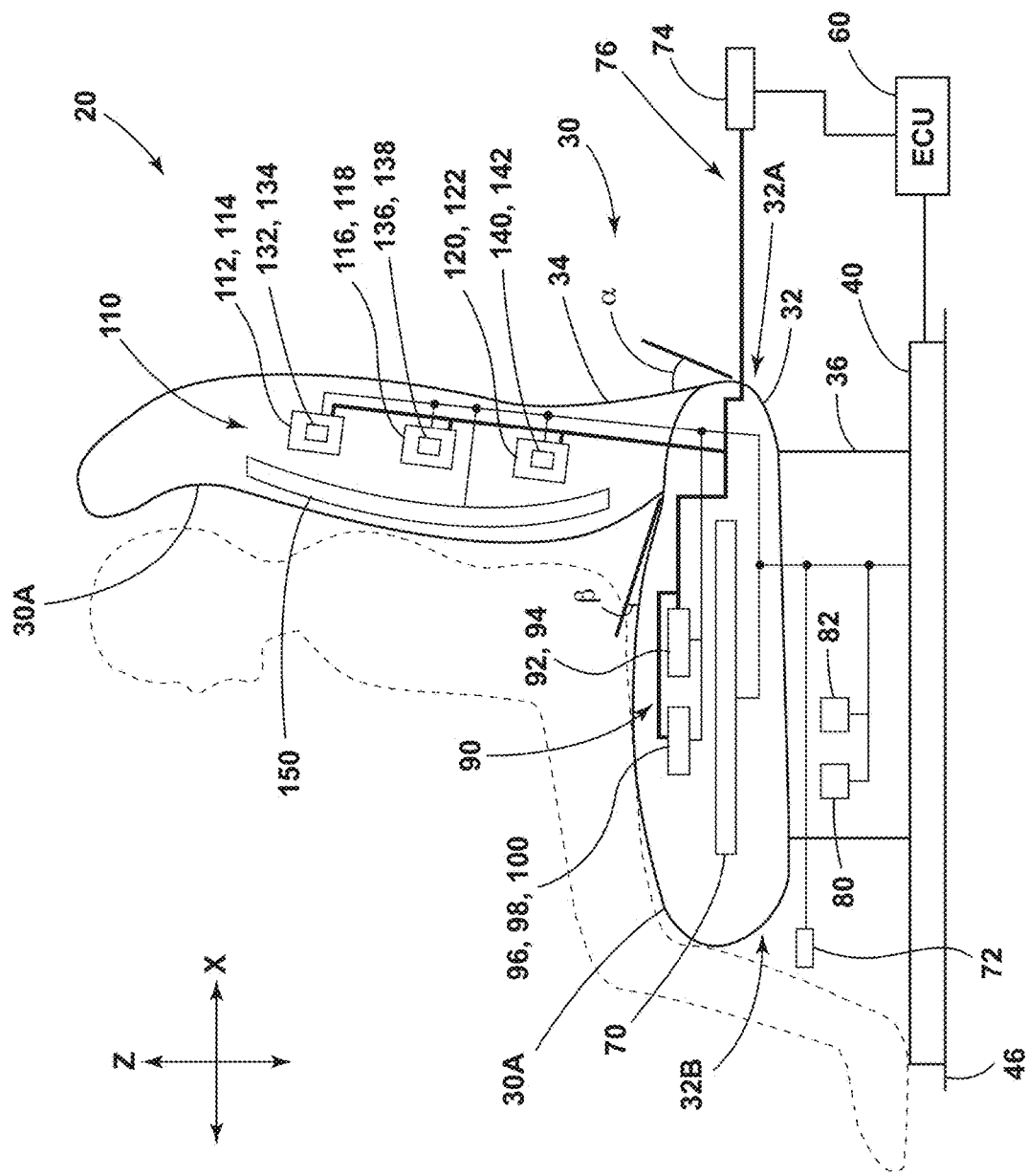
FIG. 1 is a side view generally illustrating an embodiment of a seat assembly according to teachings of the present disclosure.
Figure 2:
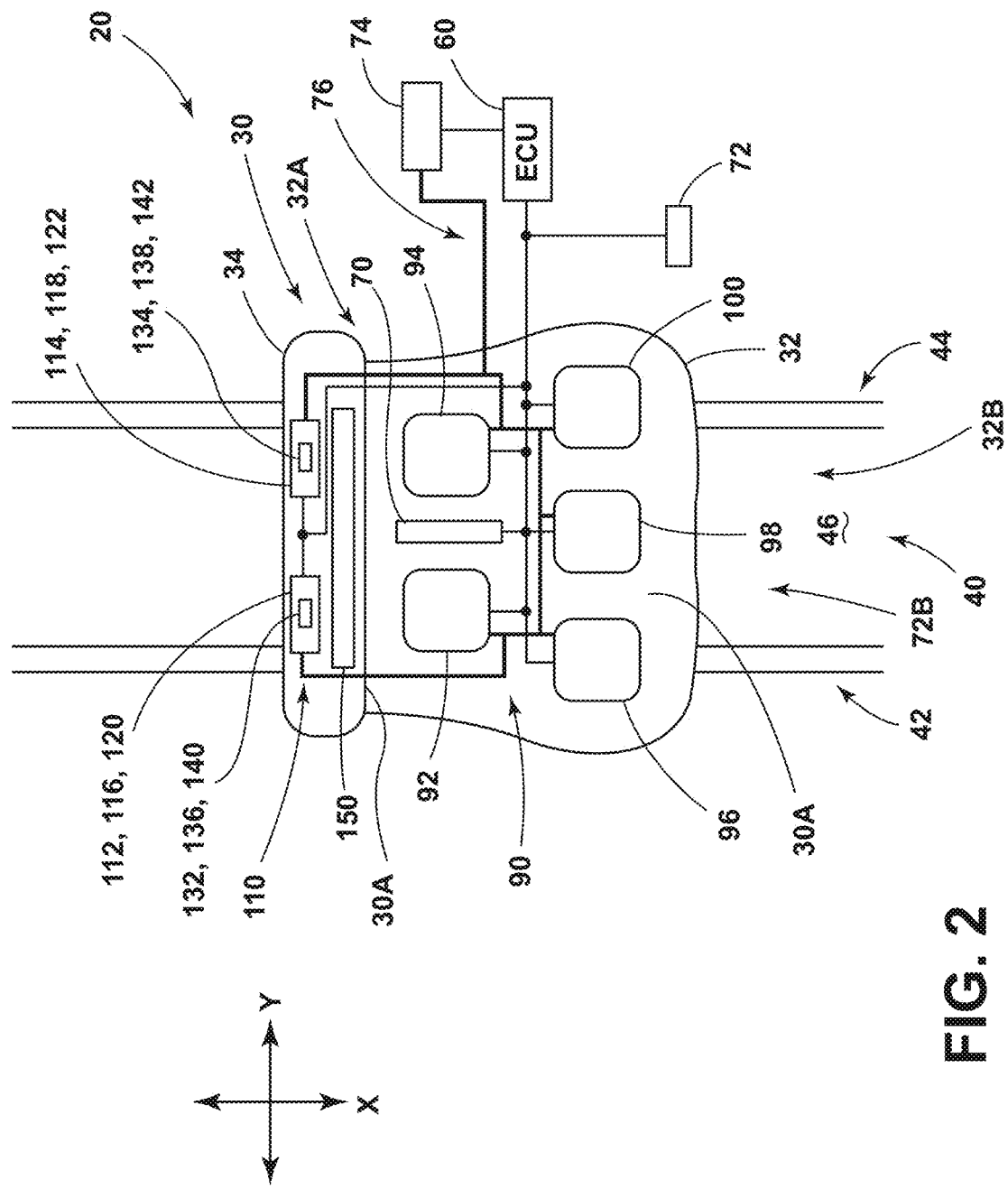
FIG. 2 is a top view generally illustrating an embodiment of a seat assembly according to teachings of the present disclosure.

In embodiments, such as generally illustrated in FIGS. 1 and 2, a seat assembly 20 may include a seat 30, an electronic control unit (ECU) 60, a sensor 70, a first bladder assembly 90, a second bladder assembly 110, a pulsed electromagnetic field (PEMF) coil assembly 130, and/or a temperature control unit 150. The ECU 60 may be connected with the seat 30, the biomedical sensor 70, the first bladder assembly 90, the second bladder assembly 110, the PEMF coil assembly 130, and/or the temperature control unit 150. The ECU 60 may be configured to determine if a user is exhibiting small fidgets and/or large fidgets, such as via the sensor 70 and/or a bladder assembly 90, 110. The ECU 60 may be configured to activate the bladder assemblies 90, 110, the PEMF coil assembly 130, and/or actuate the seat 30 to reduce small fidgets and/or large fidgets exhibited by the user.

With embodiments, such as generally illustrated in FIGS. 1 and 2, the seat assembly 20 may include at least one seat 30. The seat 30 may include a seat base 32 and/or a seat back

34. The seat 30 may be selectively connected (e.g., electrically and/or mechanically) to the track assembly 40. The ECU 60 may be electrically connected to the seat 30 via the track assembly 40 and/or the ECU 60 may be configured to at least partially control operation of the seat 30. The seat 30 may be connected with the track assembly 40 via a support member 36. The support member 36 may be selectively connected with the track assembly 40. For example and without limitation, the support member 36 may be configured to be inserted vertically and/or horizontally into the track assembly 40, such in a plurality and/or numerous positions. The support member 36 may be configured to be removed vertically and/or horizontally from the track assembly 40, such in a plurality and/or numerous positions. The support member 36 may be configured to move along the track assembly 40 (e.g., in the X-direction and/or Y-direction).

In embodiments, such as generally illustrated in FIG. 2, a track assembly 40 may include a first portion 42 and/or a second portion 44 that may, for example, extend generally in an X-direction. The track assembly 40 may be disposed on a mounting surface 46 (e.g., a vehicle floor). The track assembly 40 may be configured to connect with and/or at least partially receive the seat 30 substantially in an X-direction and/or Z-direction. The seat 30 and/or the support member 36 may be configured to be selectively inserted into and/or selectively removed from the track assembly 40 in one or more of a variety of locations along the track assembly 40. The track assembly 40 may include one or more of a variety of shapes, sizes, and/or configurations. The track assembly 40 may extend in the X-direction and/or the Y-direction (and/or or one or more other directions) such that the seat 30 may move in the X-direction and/or the Y-direction along the track assembly 40. With some embodiments, a seat 30 may be connected directly to a mounting surface 46, such as independent of/without a track assembly 40.

With embodiments, such as generally illustrated in FIGS. 1, 2, 3, and 4, a seat assembly 20 may include a sensor 70. The sensor 70 may be configured to sense e.g., measure, detect, obtain, monitor, etc.) biometric and/or biomedical information of the user occupying the seat 30, and may be referred to herein as a biomedical sensor 70 but is not limited to a biomedical sensor. For example and without limitation, the sensor 70 may be configured to identify a user (e.g., a seat occupant) and/or measure a heart rate, a breathing rate, a blood pressure, small fidgets, large fidgets, and/or other heath related information of the user. One or more portions of the sensor 70 may be disposed in the seat base 32 and/or the seat back 34. One or more portions of the sensor 70 may be disposed proximate a seating surface 30A of the seat 30 such as to increase the accuracy of sensed biomedical information. The seating surface 30A may include an outer surface of the seat base 32 and/or an outer surface of the seat back 34. A sensor 70 may, for example and without limitation, include a camera/visual device, a force sensor, and/or a pressure sensor, among others.

With embodiments, a sensor 70 may, for example and without limitation, include portions of and/or be integrated at least partially with the first bladder assembly 90 and/or the second bladder assembly 110. In some circumstances, the sensor 70 may include one or more pressure sensors connected to and/or integrated with the first bladder assembly 90 and/or the second bladder assembly 110. Changes in pressure in the bladder assemblies 90, 110 may indicate that a user is fidgeting and/or is experiencing discomfort. The amount of a pressure change may correspond to the magnitude of the movement.

In embodiments, a sensor 70 may be configured to obtain information relating to movements of a user while the user is occupying and/or proximate a seat 30. Some movements may, for example, suggest that a user is uncomfortable. For example and without limitation, a sensor 70 may be configured to detect small movements (e.g., small fidgets) and/or large movements (e.g., large fidgets). Small movements/fidgets may include movements having a magnitude (e.g., distance moved, force applied/removed, pressure change, etc.) below a threshold. Large movements/fidgets may include movements having a magnitude above the threshold. The threshold may, for example and without limitation, include a pressure threshold (e.g., pressure may be sensed by a pressure sensor of the sensor 70), a force threshold, and/or a distance threshold (e.g., distance may be sensed by a camera/visual device of the sensor 70), among others. Depending on the specified value or threshold, movements with magnitudes at or about the specified value or threshold may be small movements or large movements. Additionally or alternatively, if the magnitude of a movement is about equal to the specified value or threshold, the ECU 60 may default to one of the first mode and the second mode, such as the second mode (e.g., the second mode may include some or all functions actions of the first mode).

In embodiments, the ECU 60 may determine that the user is in a first state if the sensor 70 senses small movements/fidgets. Small fidgets may be small movements associated with short-term discomfort and/or localize discomfort/pain (e.g., that may generally be exhibited over shorter periods of time, such as shorter travel distances). The ECU 60 may determine that the user is in a second state if the sensor 70 senses large fidgets. Large fidgets may be large movements associated with long-term discomfort and/or more diffuse/generalized discomfort/pain (e.g., that may generally be exhibited over longer periods of time, such as longer travel distances). The ECU 60 may be configured to reduce small fidgets and/or large fidgets, such as by activating a first actuator 80, a second actuator 82, a first bladder assembly 90, a second bladder assembly 110, a PEMF coil assembly 130, and/or a temperature control unit 150.

With embodiments, a seat assembly 20 may include a user interface 72. The user interface 72 may be electrically connected (e.g., via wired and/or wireless connection) with the ECU 60 such that the user may manually control, at least to some degree, the seat assembly 20. The user interface 72 may be configured to receive one or more of a variety of inputs (e.g., physical input via buttons, motion input via a motion sensor, audio input via a microphone, etc.). The user interface 72 may be configured manually control the first actuator 80, the second actuator 82, the first bladder assembly 90, the second bladder assembly 110 the PEMF coil assembly 130, and/or the temperature control unit 150, directly and/or via the ECU 60.

Figure 3:
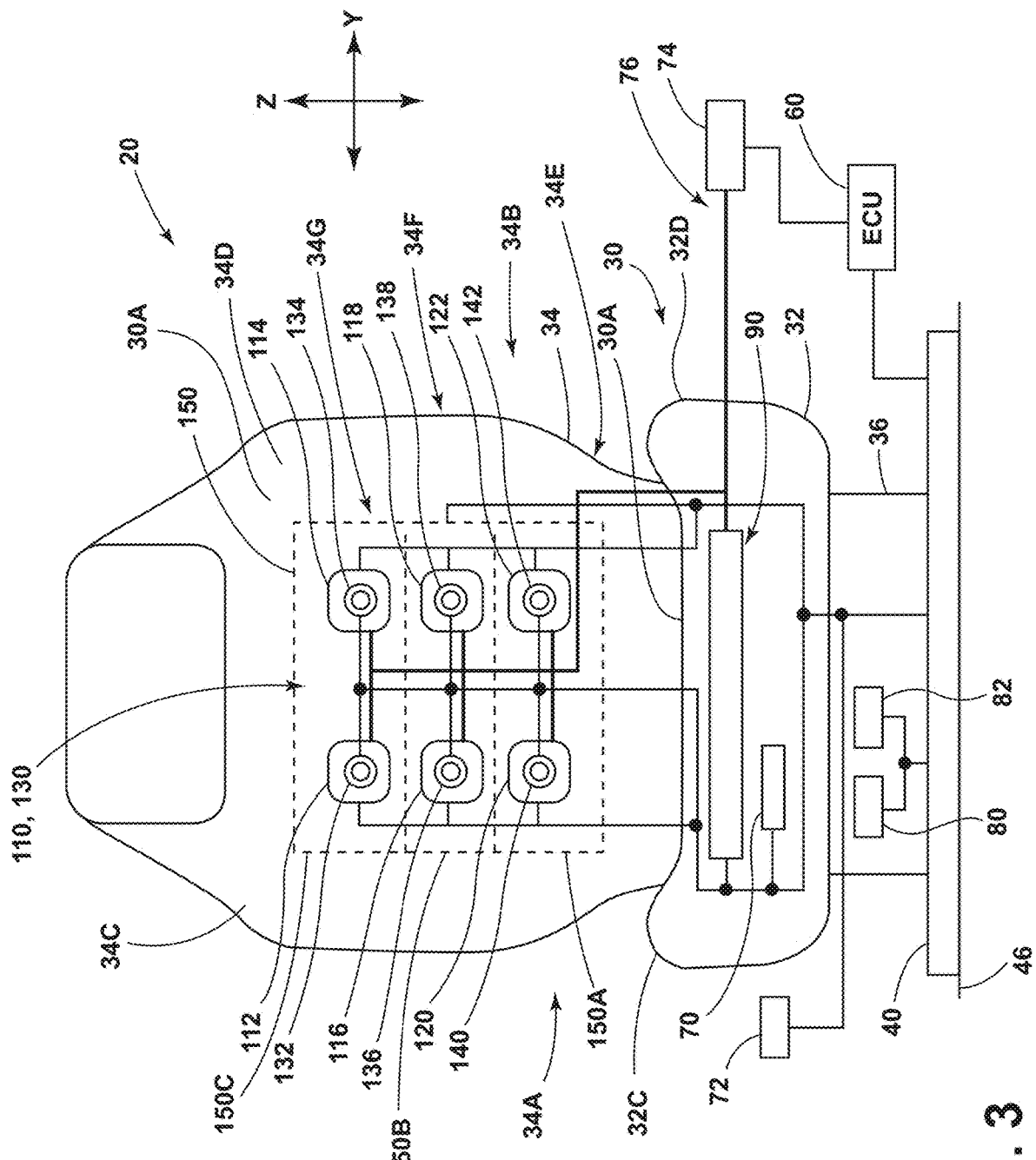
FIG. 3 is a front view generally illustrating portions of an embodiment of a seat assembly according to teachings of the present disclosure.
Figure 4:
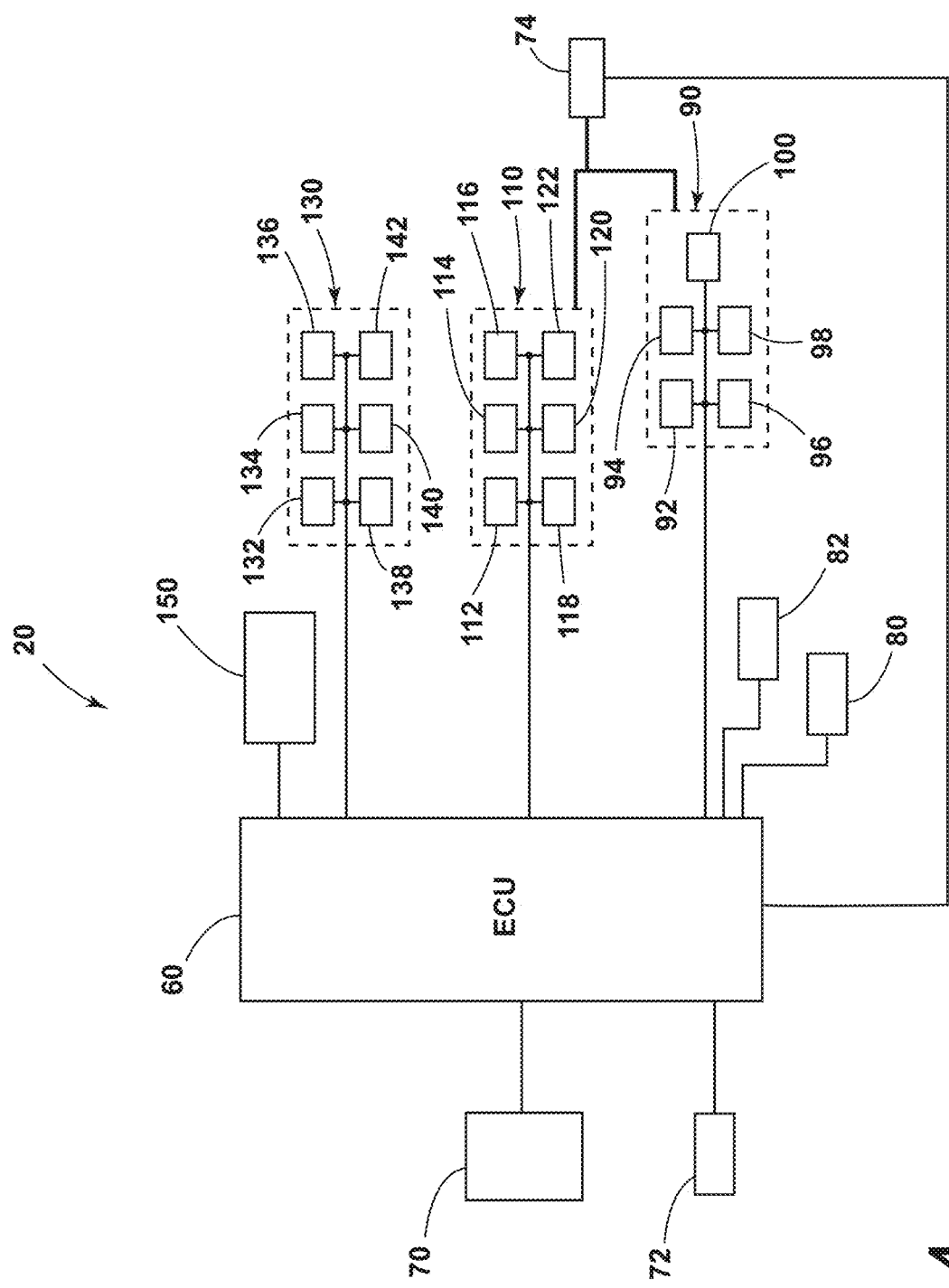
FIG. 4 is a schematic generally illustrating portions of an embodiment of a seat assembly according to teachings of the present disclosure.

With embodiments, such as generally illustrated in FIGS. 1, 3, and 4, a seat assembly 20 may include a first actuator 80 (e.g., a first electric motor) that may be connected with the seat base 32, and/or may include a second actuator 82 (e.g., a second electric motor) that may be connected with the seat back 34. The first actuator 80 and/or the second actuator 82 may be connected to and/or disposed in the seat 30 and/or the support member 36. The first actuator 80 may be configured to actuate (e.g., rotate, shift, tilt, raise, lower, etc.) the seat base 32, such as in a first direction (e.g., rearward/clockwise in FIG. 1) and/or a second direction (e.g., forward/counterclockwise in FIG. 1). The first actuator 80 may, for example and without limitation, be configured to rotate the seat base 32 about 90 degrees or more or less. The second actuator 82 may be configured to actuate (e.g., recline, rotate, shift, tilt, raise, lower, etc.) the seat back 34, such as in a first direction (e.g., clockwise-direction) and/or a second direction (e.g., a counter-clockwise direction). The second actuator 82 may, for example and without limitation, rotate the seat back 34 about 180 degrees or more or less. The ECU 60 may be configured to control the first actuator 80 and/or the second actuator 82. For example and without limitation, the first actuator 80 and/or the second actuator 82 may be electrically connected (e.g., via wired and/or wireless connection) with the ECU 60. The first actuator 80 and/or the second actuator 82 may be manually controlled by the user via the user interface 72 and/or may be automatically controlled by the ECU 60 (e.g., to automatically reduce small movements/fidgets and/or large movements/fidgets). In some circumstances, the ECU 60 may automatically operate the first actuator 80 and/or the second actuator 82 in relatively small increments (e.g., a few degrees of less of rotation), which may move the user to a relatively small extent, but may facilitate reduction of small movements/fidgets and/or large movement/fidgets.

In embodiments, such as generally illustrated in FIGS. 1, 2, 3, and 4, a first bladder assembly 90 may include any appropriate number of bladders. For example and without limitation, the first bladder assembly 90 may include a first bladder 92, a second bladder 94, a third bladder 96, a fourth bladder 98, and/or a fifth bladder 100. The first bladder assembly 90 may be disposed at least partially in the seat base 32 and/or bolsters 32C, 32D thereof. The first bladder 92 and/or the second bladder 94 may be disposed proximate a rear side 32A of the seat base 32. The third bladder 96, the fourth bladder 98, and/or the fifth bladder 100 may be disposed proximate a front side 32B of the seat base 32. The rear side 32A of the seat base 32 may be opposite the front side 32B of the seat base 32.

With embodiments, the ECU 60 may be configured to control the first bladder assembly 90. For example and without limitation, the ECU 60 may be electrically connected (e.g., via wired and/or wireless connection) to first bladder assembly 90 and/or a fluid source 74 that may be in fluid communication with the first bladder assembly 90, such as via one or more fluid conduits 76. The fluid source 74 may, for example and without limitation, include a fluid pump, a fan, a fluid reservoir, and/or one or more control valves, among other components, that may be configured to selectively provide fluid (e.g., air) to and/or remove fluid from the first bladder assembly 90 and/or the second bladder assembly 110. For example and without limitation, the fluid source 74 may be in fluid communication with the bladder assemblies 90, 110 via one or more fluid conduits 76 (e.g., tubes, hoses, ducts, etc.). The ECU 60 may control the fluid source 74 to control the bladder assemblies 90, 110.

With embodiments, the ECU 60 may be configured to independently control operation of the first bladder 92, the second bladder 94, the third bladder 96, the fourth bladder 98, and/or the fifth bladder 100. The ECU 60 may be configured to inflate and/or deflate the bladders 92-100 of the first bladder assembly 90, such as to adjust a position of and/or pressure/force applied to the user while occupying/proximate the seat 30. Inflating and deflating the bladders 92-100 may, at least to some degree, reduce small fidgets and/or large fidgets exhibited by the user. For example and without limitation, if the ECU 60 determines, via the sensor 70, that a left leg of the user is exhibiting small fidgets and/or large fidgets, the ECU 60 may inflate the second bladder 94, the fourth bladder 98, and/or the fifth bladder 100 to reduce fidgets. Similarly, if the ECU 60 determines that a right leg of the user is exhibiting small fidgets and/or large fidgets, the ECU 60 may inflate the first bladder 92, the third bladder 96, and/or the fourth bladder 98 to reduce fidgets. The ECU 60 may inflate the bladders 92-100 of the first bladder assembly 90 to a first level to reduce small fidgets, and/or the ECU 60 may inflate the bladders 92-100 to a second level to reduce large fidgets. The second level of inflation may be greater than the first level of inflation.

In embodiments, the ECU 60 may be configured to automatically activate the first bladder assembly 90 upon sensing small fidgets and/or large fidgets. For example and without limitation, the ECU 60 may identify whether the user is in a first state (e.g., small fidgets) and/or in a second state (e.g., large fidgets) via the sensor 70, and/or the ECU 60 may automatically inflate the first bladder assembly 90 at the first level and/or the second level, respectively. Additionally or alternatively, the user may manually activate the bladders 92-100 of the first bladder assembly 90, such as via a user interface 72 that may be connected with the ECU 60 and/or the first bladder assembly 90. For example, the user may manually select individual bladders 92-100 of the first bladder assembly 90 to inflate and/or deflate.

With embodiments, such as generally illustrated in FIGS. 1, 2, 3, and 4, a second bladder assembly 110 may include one or more massage bladders 112-122. For example and without limitation, the second bladder assembly 110 may include a first massage bladder 112, a second massage bladder 114, a third massage bladder 116, a fourth massage bladder 118, a fifth massage bladder 120, and/or a sixth massage bladder 122. The first massage bladder 112, the third massage bladder 116, and/or the fifth massage bladder 120 may be disposed proximate a first side 34A (e.g., the left side in FIG. 2) of the seat back 34 and/or bolsters 34C, 34D thereof. The second massage bladder 114, the fourth massage bladder 118, and/or the sixth massage bladder 122 may be disposed proximate a second side 34B (e.g., the right side in FIG. 2) of the seat back 34. The first side 34A of the seat back 34 may be opposite the second side 34B of the seat back 34.

In embodiments, the ECU 60 may control operation of the second bladder assembly 110 and/or the massage bladders 112-122, and/or may be electrically connected thereto (e.g., directly and/or wirelessly). For example and without limitation, the ECU 60 may be configured to independently control operation of the first massage bladder 112, the second massage bladder 114, the third massage bladder 116, the fourth massage bladder 118, the fifth massage bladder 120, and/or the sixth massage bladder 122. The ECU 60 may inflate and/or deflate the second bladder assembly 110, such as to provide a massaging effect to the back of the user. The ECU 60 may be configured to inflate the massage bladders 112-122 to one or more of a variety of pressures or volumes (e.g., that may be associated with a variety of massage pressure intensities, such as from light massaging to deep tissue therapy). Additionally or alternatively, the ECU 60 may activate the second bladder assembly 110 in a first mode to reduce small fidgets of the user when the user is in the first state, and/or the ECU 60 may activate the second bladder assembly 110 in a second mode to reduce large fidgets of the user when the user is in the second state. For example and without limitation, operating the second bladder assembly 110 in the first mode may include inflating and/or deflating the fifth massage bladder 120 and/or the sixth massage bladder 122, which may apply pressure/force (e.g., may massage) a lumbar area of the user (e.g., proximate a lower portion 34E of the seat back 34). Operating the second bladder assembly 110 in the second mode may include inflating and/or deflating the first massage bladder 112, the second massage bladder 114, the third massage bladder 116, the fourth massage bladder 118, the fifth massage bladder 120, and/or the sixth massage bladder 122, which may massage a shoulder area, a thoracic area, and/or a lumbar area of the user (e.g., proximate an upper portion 34G, a middle portion 34F, and a lower portion 34E, respectively, of the seat back 34).

With embodiments, the ECU 60 may be configured to automatically activate the second bladder assembly 110 upon sensing small fidgets and/or large fidgets. For example and without limitation, the ECU 60 may identify whether the user is exhibiting small fidgets and/or large fidgets via the sensor 70, and/or the ECU 60 may automatically activate the second bladder assembly 110 in the first mode (e.g., if the user is in the first state) and/or the second mode (e.g., if the user is in the second state). Additionally or alternatively, the user may manually activate the massage bladders 112-122 of the second bladder assembly 110, such as via a user interface 72 that may be connected with the ECU 60 and/or the second bladder assembly 110.

In embodiments, in the first mode and/or the second mode, the ECU 60 may activate the second bladder assembly 110 proximate a lower portion 34E, a middle portion 34F, and/or the upper portion 34G of the seat back 34.

In embodiments, such as generally illustrated in FIGS. 1, 2, 3, and 4, the seat assembly 20 may include a pulsed electromagnetic field (PEMF) coil assembly 130. The PEMF coil assembly 130 may include one or more PEMF coils 132-142. For example and without limitation, the PEMF coil assembly 130 may include a first coil 132, a second coil 134, a third coil 136, a fourth coil 138, a fifth coil 140, and/or a sixth coil 142. The coils 132-142 may be disposed at least partially within the seat back 34. In some embodiments, the coils 132-142 may be disposed at least partially in the second bladder assembly 110. For example and without limitation, the coils 132-142 may be disposed in respective massage bladders 112-122—the first coil 132 may be disposed in the first massage bladder 112, the second coil 134 may be disposed in the second massage bladder 114, the third coil 136 may be disposed in the third massage bladder 116, the fourth coil 138 may be disposed in the fourth massage bladder 118, the fifth coil 140 may be disposed in the fifth massage bladder 120, and/or the sixth coil 142 may be disposed in the sixth massage bladder 122. Disposing a coil 132-142 at least partially in a massage bladder 112-122 may, for example, reduce the amount of space utilized by the second bladder assembly 110 and the PEMF coil assembly 130, and/or may facilitate alignment of the second bladder assembly 110 and the PEMF coil assembly 130 with appropriate portions of a user (e.g., a bladder and a coil may both be aligned to be centered on the same portion of a user). In other embodiments, some or all of the coils 132-142 may not be disposed in respective massage bladders 112-122. The PEMF coil assembly 130 may be electrically connected (e.g., via wired and/or wireless connection) with the ECU 60 and/or the ECU 60 may activate and/or deactivate the PEMF coil assembly 130. For example and without limitation, in the first mode and/or the second mode, the ECU 60 may activate the PEMF coil assembly 130 proximate a lower portion 34E, a middle portion 34F, and/or the upper portion 34G of the seat back 34.

With embodiments, activating the PEMF coil assembly 130 may reduce discomfort (e.g., small fidgets and/or large fidgets), such as discomfort that may be associated with osteo-articular pain and/or inflammation. The ECU 60 may independently control operation of the coils 132-142 such that the ECU 60 may apply PEMF therapy to specific areas of the user. For example and without limitation, the ECU 60 may operate the PEMF coil assembly 130 in a first mode to reduce small fidgets (e.g., when the user is in the first state) and/or a second mode to reduce large fidgets (e.g., when the user is in the second state). When the PEMF coil assembly 130 is in the first mode, the ECU 60 may activate the fifth coil 140 and/or the sixth coil 142. Operating the PEMF coil assembly 130 in the first mode may, for example, provide PEMF therapy to the lumbar area of the user (e.g., proximate the lower portion 34E of the seat back 34), which may reduce small fidgets. Operating the PEMF coil assembly 130 in the second mode may, for example, provide PEMF therapy to a portion or substantially all of the back of the user (e.g., a shoulder area, a thoracic area, and/or a lumbar area proximate portions 34G, 34F, 34E), which may reduce large fidgets. When the PEMF coil assembly 130 is in the second mode, the ECU 60 may supply power (e.g., from a power source, such as a battery) to the first coil 132, the second coil 134, the third coil 136, the fourth coil 138, the fifth coil 140, and/or the sixth coil 142.

In embodiments, the ECU 60 may be configured to automatically activate the PEMF coil assembly 130 upon sensing that the user is in the first state and/or the second state. For example and without limitation, the ECU 60 may identify whether the user is exhibiting small fidgets and/or large fidgets via the sensor 70, and/or the ECU 60 may automatically activate the PEMF coil assembly 130 in the first mode (e.g., if small fidgets are sensed) and/or the second mode (e.g., if large fidgets are sensed). Additionally or alternatively, the user may manually activate the coils 132-142 of the PEMF coil assembly 130, such as via a user interface 72 that may be connected with the ECU 60 and/or the PEMF coil assembly 130.

With embodiments, such as generally illustrated in FIGS. 1, 2, 3, and 4, a seat assembly 20 may include a temperature control unit 150. The temperature control unit 150 may be disposed at least partially within the seat 30, such as at least partially withing the seat base 32 and/or the seat back 34. The temperature control unit 150 may, for example, be disposed at least partially in a middle portion 34F of the seat back 34 such as to be generally centered in a Y-direction and/or a Z-direction with respect to the back of a user.

In embodiments, a temperature control unit 150 may include one or more zones 150A, 150B, 150C (see, e.g., FIG. 3). The first zone 150A may correspond to a lumber area of the user, and/or may be least partially aligned with or disposed in a lower portion 34E of the seat back 34. The second zone 150B may correspond to a lower thoracic area of the user, and/or may be at least partially aligned with or disposed in a middle portion 34F of the seat back 34. The third zone 150C may correspond to an upper thoracic/shoulder area of the user, and/or may be at least partially aligned with or disposed in an upper portion 34G of the seat back 34. The zones 150A, 150B, 150C may be independently controlled by the temperature control unit 150 and/or the ECU 60. The first zone 150A may be disposed at least partially below the second zone 150B, which may be disposed at least partially below the third zone 150C.

With embodiments, at least a portion of the temperature control unit 150 may be disposed proximate a seating surface 30A of the seat back 34, such as to facilitate a user feeling the effects (e.g., heating, cooling, venting, etc.) of the temperature of the temperature control unit 150. The ECU 60 may control operation of and/or be electrically connected to (e.g., via wired and/or wireless connection) the temperature control unit 150. The ECU 60 may activate the temperature control unit 150 to reduce small fidgets and/or large fidgets exhibited by the user. For example and without limitation, the ECU 60 may control the temperature control unit 150 to provide cooling, venting, and/or warming/heating, which may facilitate reducing small fidgets and/or large fidgets. A temperature control unit 150 may, for example and without limitation, include an air conditioner, a fan/air mover, and/or a heater.

In embodiments, an ECU 60 may determine whether to active the temperature control unit 150 and/or a target temperature, at least in part, relative to one or more temperatures proximate the seat 30. The one or more temperatures may, for example and without limitation, include an ambient temperature (e.g., an interior or cabin temperature) and/or an exterior/outside temperature (e.g., outside a vehicle cabin). For example and without limitation, if an interior temperature and/or an exterior temperature is above a first temperature threshold (e.g., relatively warm/hot, such as above about 75 degrees Fahrenheit), the ECU 60 may operate the temperature control unit 150 in a cooling and/or venting mode, which may reduce a temperature proximate the seat 30 and/or at or about the seating surface 30A. In a cooling mode, the temperature control unit 150 may, for example, provide cooled air proximate the seat 30 and/or the seating surface 30A. A temperature of the cooled air may, for example, be at or below the first temperature threshold.

With embodiments, if an interior temperature and/or the exterior temperature is below a second temperature threshold (e.g., relatively cool/cold, such as below about 55 degrees Fahrenheit), the ECU 60 operate the temperature control unit 150 in a heating mode. In the heating mode, the temperature control unit 150 may energize an electrical heater and/or may provide heated air proximate the seat 30 and/or the seating surface 30A. A temperature of the heater and/or the heated air may be greater than the second temperature threshold. Activating the temperature control unit 150 in a cooling mode, a venting mode, and/or a heating mode may reduce fidgets of the user when the user in the first state and/or the second state. The ECU 60 may be configured to automatically activate the temperature control unit 150 upon determining (e.g., via the sensor 70) that the user is making small movements/fidgets and/or large movements/fidgets. Automatically activating the temperature control unit 150 may reduce small fidgets and/or large fidgets prior to the user recognizing that they are experiencing discomfort or fidgeting. Additionally or alternatively, the user may manually activate the temperature control unit 150, such via a user interface 72 that may be connected with the ECU 60 and/or the temperature control unit 150. A user may activate the temperature control unit 150 and/or may set the temperature control unit 150 to a desired temperature via the user interface 72.

With embodiments, the ECU 60 may be configured to record and/or predict operation of the seat assembly 20. For example and without limitation, the ECU 60 may predict, based on prior use of the seat assembly 20, when the user is likely to exhibit small fidgets and/or large fidgets, and/or the ECU 60 may be configured to predict a preferred temperature of the temperature control unit 150. The ECU 60 may be configured for machine learning to automatically activate the seat assembly 20 in an appropriate manner (e.g., according to determined/learned and/or obtained preferences of the user) to reduce and/or prevent fidgets by the user occupying the seat 30.

Figure 5:
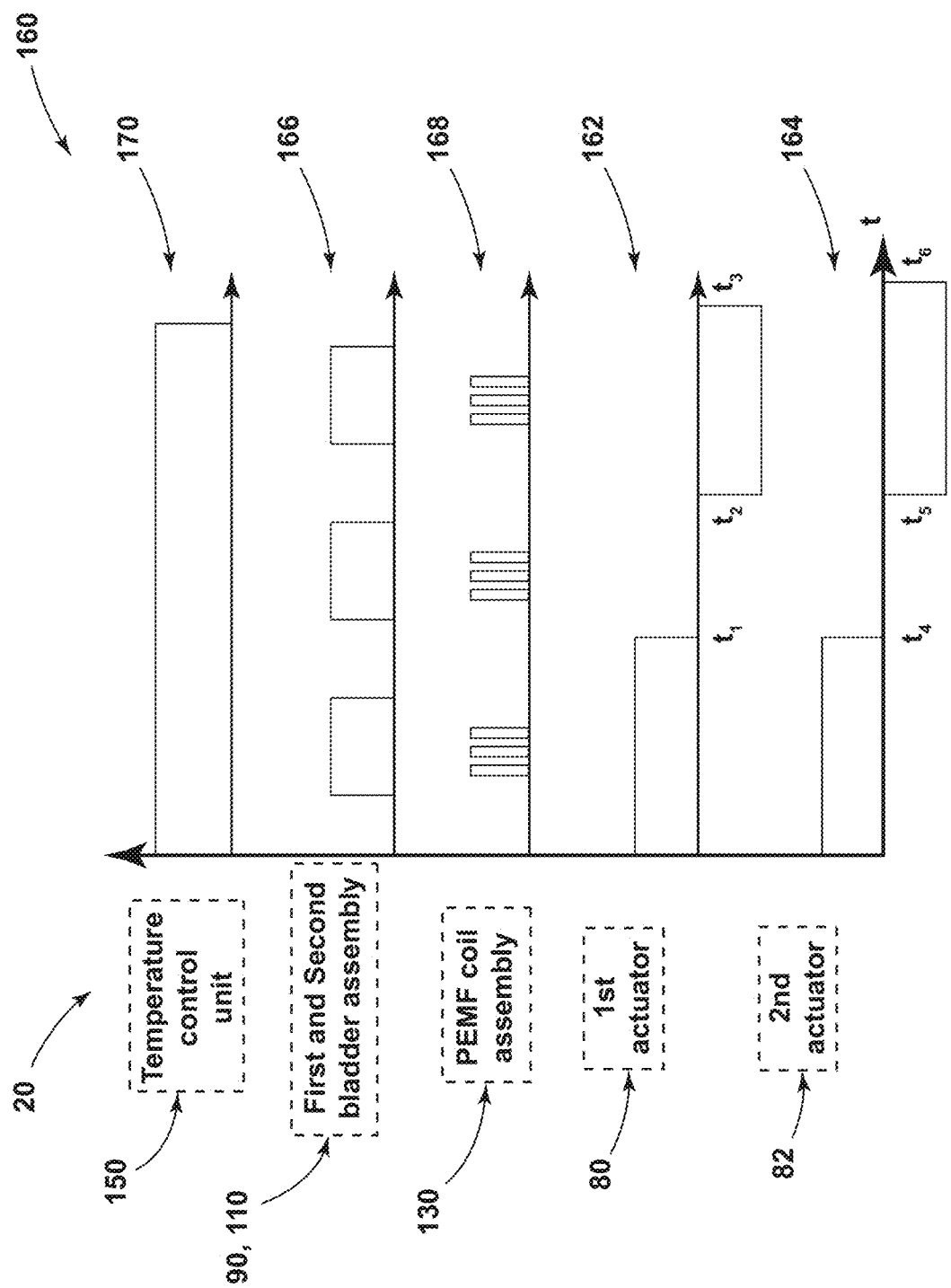
FIG. 5 is a graph generally illustrating portions of an embodiment of a method of operating a seat assembly according to teachings of the present disclosure.
Figure 6:
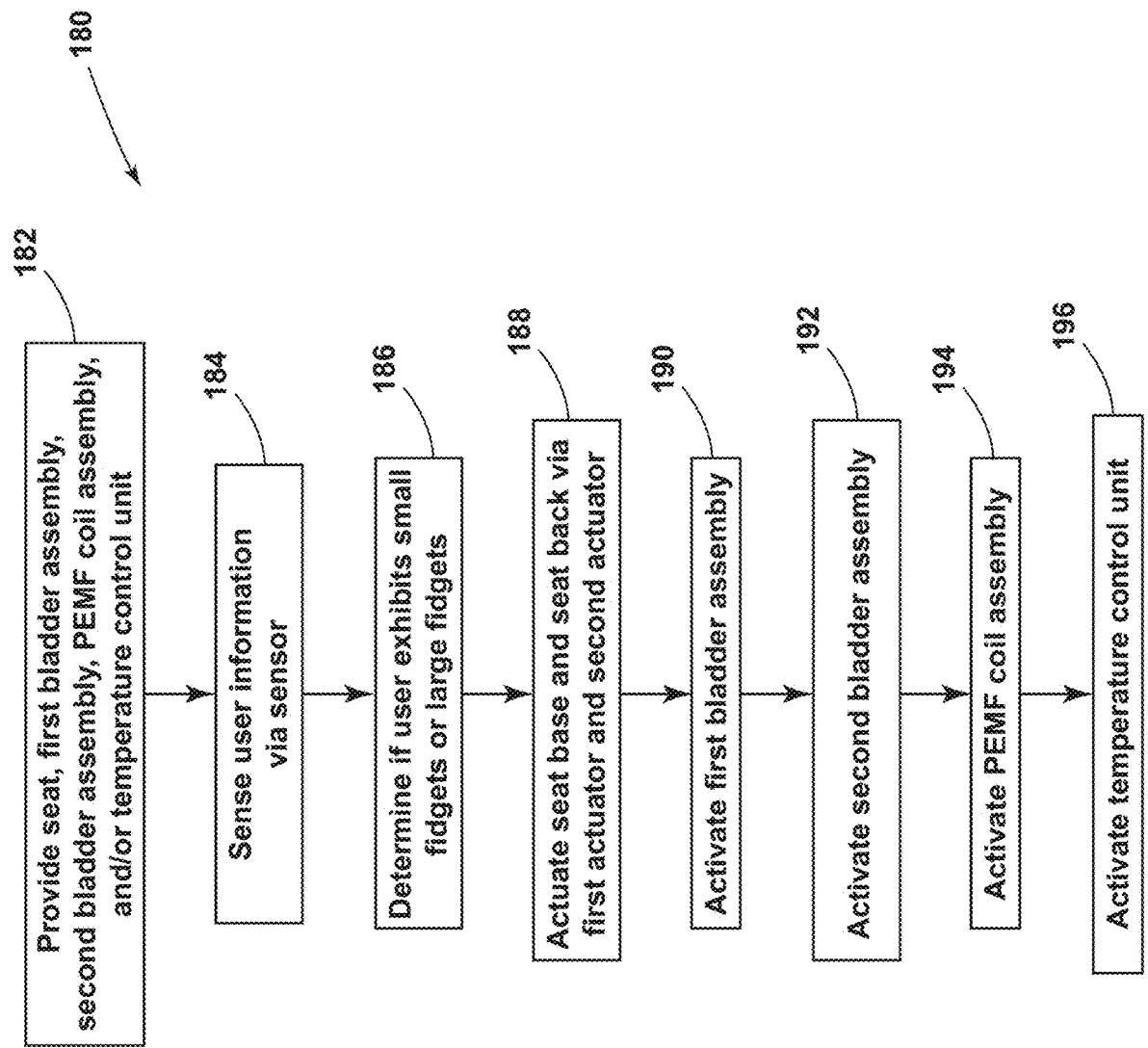
FIG. 6 is a flow chart generally illustrating a method of operating a seat assembly according to teachings of the present disclosure.

With embodiments, such as generally illustrated in FIG. 6, a method 180 of operating a seat assembly 20 may include providing a seat 30, a sensor 70, a first actuator 80, a second actuator 82, a massage, a first bladder assembly 90, a second bladder assembly 110, a PEMF coil assembly 130, and/or a temperature control unit 150 (step 182). The seat assembly 20 may include an ECU 60 connected with the sensor 70, the first actuator 80, the second actuator 82, the first bladder assembly 90, the second bladder assembly 110, the PEMF coil assembly 130, and/or the temperature control unit 150. The method 180 may include sensing biomedical information of a user occupying the seat 30 via the sensor 70 (step 184) and/or determining if the user is making small movements/fidgets and/or large movement/fidgets (step 186). If the user exhibits small fidgets and/or large fidgets, the ECU 60 may selectively activate the first actuator 80, the second actuator 82, the first bladder assembly 90, the second bladder assembly 110, the PEMF coil assembly 130, and/or the temperature control unit 150 to reduce small fidgets and/or large fidgets (see, e.g., sample activation plots in FIG. 5). If the ECU 60 determines that the seat 30 (e.g., seat base 32 and/or the seat back 34) should not be actuated (e.g., if actuating the seat base 32 and/or the seat back 34 would cause contact with another seat, cargo, and/or other user), the ECU 60 may not activate the actuators 80, 82, and may activate one or more other functions, such as the first bladder assembly 90 and/or the second bladder assembly 110 to move the user at least temporarily, at least to some degree.

In embodiments, such as generally illustrated in the sample activation graph 160 of FIG. 5, the ECU 60 may utilize a plurality of seat assembly functions simultaneously and/or in alternating patterns to reduce movements/fidgets of a user. For example, if the ECU 60 senses that the user is in the first state (e.g., exhibiting small fidgets), the ECU 60 may automatically activate the first actuator 80 and/or the second actuator 82 (step 188), such as generally illustrated in actuator plots 162, 164. Activating the first actuator 80 may include rotating the seat base 32 from a first position to a second position, which may be separated by an angle $\beta$, in a first direction (e.g., upwards) over a first period of time $t_1$. For example and without limitation, the angle $\beta$ may be about 1 degree and/or the first period of time $t_1$ may be about seven seconds (see, e.g., first actuator activation plot 162). The ECU 60 may maintain the seat base 32 in the second position for a second period of time $t_2$, which may, for example and without limitation, be about five seconds. The ECU 60 may rotate the seat base 32 from the second position back to the first position (e.g., angle $\beta$) over a third period of time $t_3$, which may, for example and without limitation, be about seven seconds and/or substantially equal to the first period $t_1$.

With embodiments, activating the second actuator 82 may include rotating (e.g., rearward) the seat back 34 from a first position to a second position, which may be separated by an angle $\alpha$, in a first direction over a fourth period of time. For example and without limitation, angle $\alpha$ may be about 1.5 degrees, and/or the fourth period of time $t_4$ may be about seven seconds and/or substantially equal to (and/or coincident with) the first period of time $t_1$ (see, e.g., second actuator activation plot 164). The ECU 60 may maintain the seat back 34 in the second position for a fifth period of time $t_5$, which may, for example and without limitation, be about five seconds and/or substantially equal to (and/or coincident with) the second period $t_2$. The ECU 60 may rotate the seat back 34 from the second position back to the first position (e.g., angle $\alpha$) over a sixth period of time $t_6$, which may, for example and without limitation, be about seven seconds and/or substantially equal to (and/or coincident with) the third period of time $t_3$. Adjusting the seat base 32 and/or the seat back 34 may tend to shift the seating orientation/position of a user, at least to some degree, which may help reduce user discomfort/fidgets.

With embodiments, if the ECU 60 determines the user is making small movements/fidgets, the ECU 60 may automatically activate the first bladder assembly 90, such as at a first level and/or while the first actuator 80 and the second actuator 82 are activated (see, e.g., first bladder assembly and second bladder assembly plot 166) (step 190). Activating the first bladder assembly 90 may include periodically inflating and deflating the bladders 92-100. Additionally or alternatively, the ECU 60 may automatically activate the massage bladders 112-122 of the second bladder assembly 110, such as in a first mode (step 192). The ECU 60 may activate the fifth massage bladder 120 and/or the sixth massage bladder 122, such as to reduce small fidgets sensed by the sensor 70. Activating the second bladder assembly 110 may include periodically inflating and deflating the massage bladders 112-122 (e.g., such as generally shown in FIG. 5). The method 180 may include activating/operating the PEMF coil assembly 130 (step 194), such in a first mode to reduce small fidgets (see, e.g., PEMF coil assembly plot 168). The ECU 60 and/or the PEMF coil assembly 130 may, for example, activate the fifth coil 140 and/or the sixth coil 142 when the PEMF coil assembly 130 is operating in the first mode. Operating the PEMF coil assembly 130 in the first mode may include periodically supplying power to the coils 132-142, such as while the first bladder assembly 90 and/or the second bladder assembly 110 are activated. Additionally or alternatively, to reduce small fidgets, the ECU 60 may activate a temperature control unit 150 (step 196), such as while the first actuator 80, the second actuator 82, the first bladder assembly 90, the second bladder assembly 110, and/or the PEMF coil assembly 130 are activated (see, e.g., temperature control unit plot 170).

In embodiments, if the ECU 60 senses, via the sensor 70, that the user is making large movements/fidgets, the ECU 60 may automatically activate the first actuator 80 and/or the second actuator 82. The ECU 60 may activate the first actuator 80 and/or the second actuator 82 in a substantially similar way to reduce large fidgets as reducing small fidgets. If the ECU 60 senses that the user is in the second state, the ECU 60 may operate/activate the first bladder assembly 90, such as at a second level and/or while the first actuator 80 and/or the second actuator 82 are activated. Activating the first bladder assembly 90 may include periodically inflating and/or deflating the bladders 92-100 (e.g., such as generally shown in FIG. 5). Additionally or alternatively, the ECU 60 may automatically activate the massage bladders 112-122 of the second bladder assembly 110, such as in a second mode. The ECU 60 may activate the massage bladders 112-122 of the second bladder assembly 110 to reduce large fidgets. Activating the second bladder assembly 110 may include periodically inflating and deflating the massage bladders 112-122 (such as generally shown in FIG. 5).

With embodiments, the method 180 may include activating/operating a PEMF coil assembly 130, such as in a second mode to reduce large fidgets. The ECU 60 and/or the PEMF coil assembly 130 may activate the first coil 132, the second coil 134, the third coil 136, the fourth coil 138, the fifth coil 140, and/or the sixth coil 142 when the PEMF coil assembly 130 is operating in the second mode. Operating the PEMF coil assembly 130 in the second mode may include periodically supplying power to the coils 132-142, such as while the first bladder assembly 90 and/or the second bladder assembly 110 are activated (e.g., such as generally shown in FIG. 5). Additionally or alternatively, to reduce large fidgets, the method 180 may include activating the temperature control unit 150 while the first actuator 80, the second actuator 82, the first bladder assembly 90, the second bladder assembly 110, and/or the PEMF coil assembly 130 are activated.

In embodiments, the ECU 60 may operate in a first mode, such as to reduce the number of small user movements/fidgets, and/or in a second mode, such as to reduce the number of large user movements/fidgets. Operating the ECU 60 in a first mode may include operating a first bladder assembly 90, a second bladder assembly 110, and/or a PEMF coil assembly 130 in respective first modes. Operating the ECU 60 in a second mode may include operating a first bladder assembly 90, a second bladder assembly 110, and/or a PEMF coil assembly 130 in respective second modes.

In embodiments, the ECU 60 may operate some or all of a first actuator 80, a second actuator 82, a first bladder assembly 90, a second bladder assembly 110, a PEMF coil assembly 130, and/or a temperature control unit 150 simultaneously, at least in some instances (e.g., overlapping activation times).

While embodiments are described herein with bladder assemblies 90, 110 including bladders 92-100 and 112-122, in embodiments of seat assemblies 20, other actuators may be used in addition to or instead of bladders, such as motors and/or linear actuators/cylinders, among others.

In examples, an ECU (e.g., ECU 60) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU 60 may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples," "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or nonfunctional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A seat assembly, including:
    a seat;
    a sensor configured to sense movement of a user of the seat;
    a bladder assembly connected to the seat;
    a pulsed electromagnetic field (PEMF) coil assembly connected to the seat; and
    an electronic control unit (ECU) connected with the sensor, and configured to control the bladder assembly and the PEMF coil assembly;
    wherein the ECU is configured to determine, via the sensor, if said user is in a first state or a second state;
    the first state corresponds to one or more small user movements, small user movements including movements having magnitudes below a specified value or threshold;
    the second state corresponds to one or more large user movements, large user movements including movements having magnitudes above the specified value or threshold;
    the ECU is configured to operate in a first mode when said user is in the first state to reduce a number of the small user movements; and
    the ECU is configured to operate in a second mode when said user is in the second state to reduce a number of the large user movements.

2. The seat assembly of claim 1, wherein when the ECU operates in the first mode, the ECU is configured to activate the bladder assembly proximate a lower portion of a seat back of the seat to reduce the number of small user movements.

3. The seat assembly of claim 1, wherein when the ECU operates in the first mode, the ECU is configured to activate the PEMF coil assembly proximate a lower portion of a seat back of the seat to reduce the number of small user movements.

4. The seat assembly of claim 1, wherein when the ECU operates in the second mode, the ECU is configured to activate the bladder assembly proximate a lower portion, a middle portion, and an upper portion of a seat back of the seat to reduce the number of large user movements.

5. The seat assembly of claim 1, wherein when the ECU operates in the second mode, the ECU is configured to activate the PEMF coil assembly proximate a lower portion, a middle portion, and an upper portion of a seat back of the seat to reduce the number of large user movements.

6. The seat assembly of claim 1, including:
    a first actuator connected with a seat base of the seat; and
    a second actuator connected with a seat back of the seat;

wherein the ECU is configured to actuate the seat base via the first actuator and the seat back via the second actuator; and when the user is in at least one of the first state and the second state, the ECU is configured to automatically actuate the seat back from a first position to a second position, maintain the second position of the seat back for a first period of time, and return the seat back to the first position after the first period of time.

7. The seat assembly of claim 6, wherein a first angle between the first position and the second position of the seat back is about 1.5 degrees.

8. The seat assembly of claim 7, wherein the ECU is configured to actuate the seat back from the first position to the second position over a second period of time.

9. The seat assembly of claim 8, wherein the second period of time is longer than the first period of time.

10. The seat assembly of claim 8, wherein the second period of time is about seven seconds, and the first period of time is about five seconds.

11. The seat assembly of claim 6, wherein when the user is in at least one of the first state and the second state, the ECU is configured to automatically actuate the seat base from a first base position to a second base position;

and a second angle between the first base position and the second base position is about 1 degree.

12. The seat assembly of claim 11, wherein the ECU is configured to actuate the seat base from the first base position to the second base position over a first base period;

the ECU is configured to maintain the seat base in the second position for a second base period; and the ECU is configured to return the seat base to the first position after the second base period.

13. The seat assembly of claim 12, wherein the first base period is longer than the second base period.

14. The seat assembly of claim 1, wherein the ECU is configured to inflate and deflate the bladder assembly when the ECU is in at least one of the first mode and the second mode to reduce the number of small user movements and/or the number of large user movements.

15. The seat assembly of claim 1, including a temperature control unit configured to control a temperature proximate the seat;

wherein the temperature control unit is connected to the ECU; and the ECU is configured to provide at least one of warming and a cooling to reduce the number of small user movements and/or large user movements.

16. A method of operating a seat assembly, the method including:

determining, via a sensor, if a user of a seat is in a first state corresponding with small user movements or a second state corresponding with large user movements;

operating an electronic control unit (ECU) in a first mode if the user is in the first state to reduce the small user movements; and operating the ECU in a second mode if the user is in the second state to reduce the large user movements;

wherein operating the ECU in the first mode includes:
   activating a bladder assembly proximate a lower portion of a seat back of the seat; and
   activating a pulsed electromagnetic field (PEMF) coil assembly proximate the lower portion of the seat back; and wherein operating the ECU in the second mode includes:
   activating the bladder assembly proximate the lower portion, a middle portion, and an upper portion of the seat back, and
   activating the PEMF coil assembly proximate the lower portion, the middle portion, and the upper portion of the seat back.

17. The method of claim 16, wherein at least one of operating the ECU in the first mode and operating the ECU in the second mode includes:
   automatically actuating the seat back from a first position to a second position over a first period;
   maintaining the second position of the seat back over a second period; and
   automatically actuating the seat back from the second position to the first position after the second period.

18. The method of claim 17, wherein at least one of operating the ECU in the first mode and operating the ECU in the second mode includes:
   automatically actuating a seat base of the seat from a first base position to a second base position over the first period;
   maintaining the second base position of the seat base over the second period; and
   automatically actuating the seat base from the second base position to the first base position after the second period.

19. The method of claim 18, wherein the first period is longer than the second period.

20. The method of claim 16, operating the ECU in the first mode includes providing at least one of warming and cooling via a temperature control unit disposed in the seat back to reduce small user movements.

* * * * *